(12) United States Patent
Feng

(10) Patent No.: US 6,484,604 B1
(45) Date of Patent: Nov. 26, 2002

(54) EASY CORD-PASSING STRUCTURE OF SHIFT HANDLE OF A BICYCLE

(76) Inventor: Chi-Hsyan Feng, 1th Floor, No. 47-1, Sec. 2, Chih Cheng Road, Taipei (TW)

( * ) Notice: Subject to any disclaimer, the term of this patent is extended or adjusted under 35 U.S.C. 154(b) by 37 days.

(21) Appl. No.: 09/873,178

(22) Filed: Jun. 5, 2001

(51) Int. Cl.[7] .................................................. F16C 1/12
(52) U.S. Cl. ........................................ 74/501.6; 74/506
(58) Field of Search ...................... 74/473.13, 473.14, 74/473.3, 500.5, 501.6, 502.2, 506

(56) References Cited

U.S. PATENT DOCUMENTS

| | | | |
|---|---|---|---|
| 5,476,019 A | | 12/1995 | Cheever ........................ 74/506 |
| 5,524,501 A | * | 6/1996 | Patterson et al. ............. 74/506 |
| 6,021,688 A | * | 2/2000 | Chang ........................ 74/502.2 |
| 6,067,875 A | * | 5/2000 | Ritchey et al. ............. 74/502.2 |

* cited by examiner

*Primary Examiner*—Chong H. Kim
(74) *Attorney, Agent, or Firm*—Rosenberg, Klein & Lee

(57) ABSTRACT

Easy cord-passing structure of shift handle of a bicycle, including a fixing casing fixed around the bicycle handle and having an annular inner cavity. A rotary member is rotatably disposed in the inner cavity for pulling and releasing a steel cord. A cord-guiding link is disposed between the fixing casing and the rotary member. When the cord-guiding link is positioned in a maximum cord-loosening position, two ends of the cord-guiding link are respectively right aimed at the steel cord inlet and outlet of the fixing casing. Therefore, the steel cord can be nearly linearly smoothly passed from the steel cord inlet through the cord-guiding passage to the steel cord outlet and conducted out of the fixing casing.

5 Claims, 4 Drawing Sheets

EASY CORD-PASSING STRUCTURE OF SHIFT HANDLE OF A BICYCLE

BACKGROUND OF THE INVENTION

The present invention is related to an improved shift handle of a bicycle, and more particularly to an improved cord-pulling and releasing structure of the shift handle of the bicycle. By means of the easy cord-passing structure, the cord-passing operation becomes very easy, convenient and time-saving.

U.S. Pat. No. 5,476,019 discloses a shift handle of bicycle ( as shown in FIGS. 1 and 2 thereof ). One end of the steel cord 66 for driving a chain-shifting mechanism is conducted into the casing 16 of the shift handle and wound and fixed on outer circumference 72 of a rotary member 60. By means of rotating the rotary member 60, the steel cord 66 is wound or unwound for driving the chain-shifting mechanism and changing the sprocket.

According to the above arrangement, when assembling the shift handle, the steel cord 66 must be first conducted into the outer circumference 72 of the rotary member 60 and then conducted into the conduit 30 of the casing 16. Then, the steel cord 66 is conducted out of the other end of the conduit 30. Then, the steel cord 66 is conducted into a flexible tube 36 with the first end 76 of the steel cord 66 fixed on the rotary member 60. The steel cord 66 has a certain resilience so that it can be hardly snugly wound on the rotary member 60. It is necessary for an operator to pull and tension the steel cord 66 with one hand and install the locating catapult 44 into the arched catapult locating slot 42 of the casing 16 with the other hand. Then, the shift handle 18 is aimed at the assembling face of the casing 16 and mounted therein. The sealing cover 84 is then locked and the second end of the steel cord is fixed at the chain-shifting mechanism. During the entire assembling procedure, the steel cord 66 will always bound away to obstruct the assembling operation. Therefore, it is laborious and time-consuming to assemble the shift handle. This greatly affects the production efficiency.

SUMMARY OF THE INVENTION

It is therefore a primary object of the present invention to provide an easy cord-passing structure of shift handle of a bicycle, in which the cord-guiding link is connected between the steel cord inlet and outlet of the fixing casing, whereby the steel cord can be nearly linearly passed from the steel cord inlet through the cord-guiding passage to the steel cord outlet and out of the fixing casing. Therefore, it is unnecessary to wind the steel cord around the outer circumference of the rotary member and the cord-passing operation becomes very easy, convenient and time-saving.

It is a further object of the present invention to provide the above easy cord-passing structure in which the cord-guiding link has a straight cord-guiding passage for the steel cord to pass therethrough. One end of the cord-guiding link has a cord head locating hole in which the cord head of the steel cord is engaged. After the steel cord is passed through the cord-guiding passage, the steel cord is firmly fixed in the cord-guiding link. Accordingly, the steel cord and the cord-guiding link are prevented from freely bounding to interfere with the cord-passing operation and the cord-passing operation is facilitated.

It is a further object of the present invention to provide the above easy cord-passing structure in which the cord-guiding link not only permits the steel cord to pass therethrough, but also is able to pull the steel cord. In addition, the cord-guiding link has a hook section providing locating effect. The cord-guiding link has both functions of cord-pulling of the conventional rotary member and location of the conventional locating catapult. Therefore, the cord-passing structure of the present invention is simplified and the assembly is facilitated.

According to the above objects, the Easy cord-passing structure of shift handle of a bicycle of the present invention includes: a fixing casing formed with a central through hole for the handle of the bicycle to pass therethrough, the fixing casing being fixed around the bicycle handle and having: an annular inner cavity formed around the through hole, a locating rack having multiple waved locating teeth, the locating rack having a first end and a second end, the locating rack integrally extending from the annular inner cavity with the second end suspending in the inner cavity, a steel cord inlet being formed through the fixing casing and adjacent to the second end of the locating rack, a steel cord outlet being also formed through the fixing casing and adjacent to the first end of the locating rack; a rotary member rotatably disposed on the bicycle handle and connected with the shift handle, the rotary member being positioned in the annular inner cavity of the fixing casing and rotatable along with the shift handle; and a cord-guiding link having a first end and a second end, the first end being pivotally connected with the rotary member, the second end having a hook section snugly latched with one of the locating teeth, the hook section being slidable into the tooth trough of any other locating tooth and latch therewith, the cord-guiding link having a cord-guiding passage passing from the first end to the second end of the cord-guiding link, the cord-guiding passage being positioned between the steel cord inlet and the steel cord outlet, whereby the steel cord can be conducted from the inlet through the cord-guiding passage to the outlet and out of the fixing casing.

The easy cord-passing structure of shift handle of a bicycle further includes a retardant driving mechanism which includes a slide slot and a pivot section slidably disposed in the slide slot, one of the slide slot and the pivot section being disposed at the first end of the cord-guiding link, while the other being disposed on the rotary member, whereby the shift of the cord-guiding link is retarded after the rotation of the rotary member.

The easy cord-passing structure of shift handle of a bicycle further includes a cam fixed on the rotary member and rotatable along with the rotary member, the cam pushing the cord-guiding link and making the same pivotally rotate about the first end thereof, whereby the hook section of the cord-guiding link is disengaged from the locating tooth.

In the easy cord-passing structure of shift handle of a bicycle, the first end of the cord-guiding link further has a cord head locating hole in which the cord head of the steel cord is engaged.

The easy cord-passing structure of shift handle of a bicycle further includes a cord-guiding tube disposed in the annular inner cavity of the fixing casing, one end of the cord-guiding tube being connected at the steel cord outlet of the fixing casing, while the other end thereof being formed with a trumpet opening and adjacent to the first end of the locating rack, whereby when the rotary member is turned to a maximum cord-loosening position, the first end of the cord-guiding link is right aimed at the steel cord inlet of the fixing casing, while the second end of the cord-guiding link is right aimed at the trumpet opening of the cord-guiding tube and the steel cord inlet, the cord-guiding passage, the cord-guiding tube and the steel cord outlet are connected to form a continuous straight passage, the steel cord being smoothly conducted from the steel cord inlet into the fixing casing and through the cord-guiding passage and the cord-guiding tube and conducted out of the fixing casing from the steel cord outlet.

The present invention can be best understood through the following description and accompanying drawings wherein:

DETAILED DESCRIPTION OF THE PREFERRED EMBODIMENTS

Figure 1:
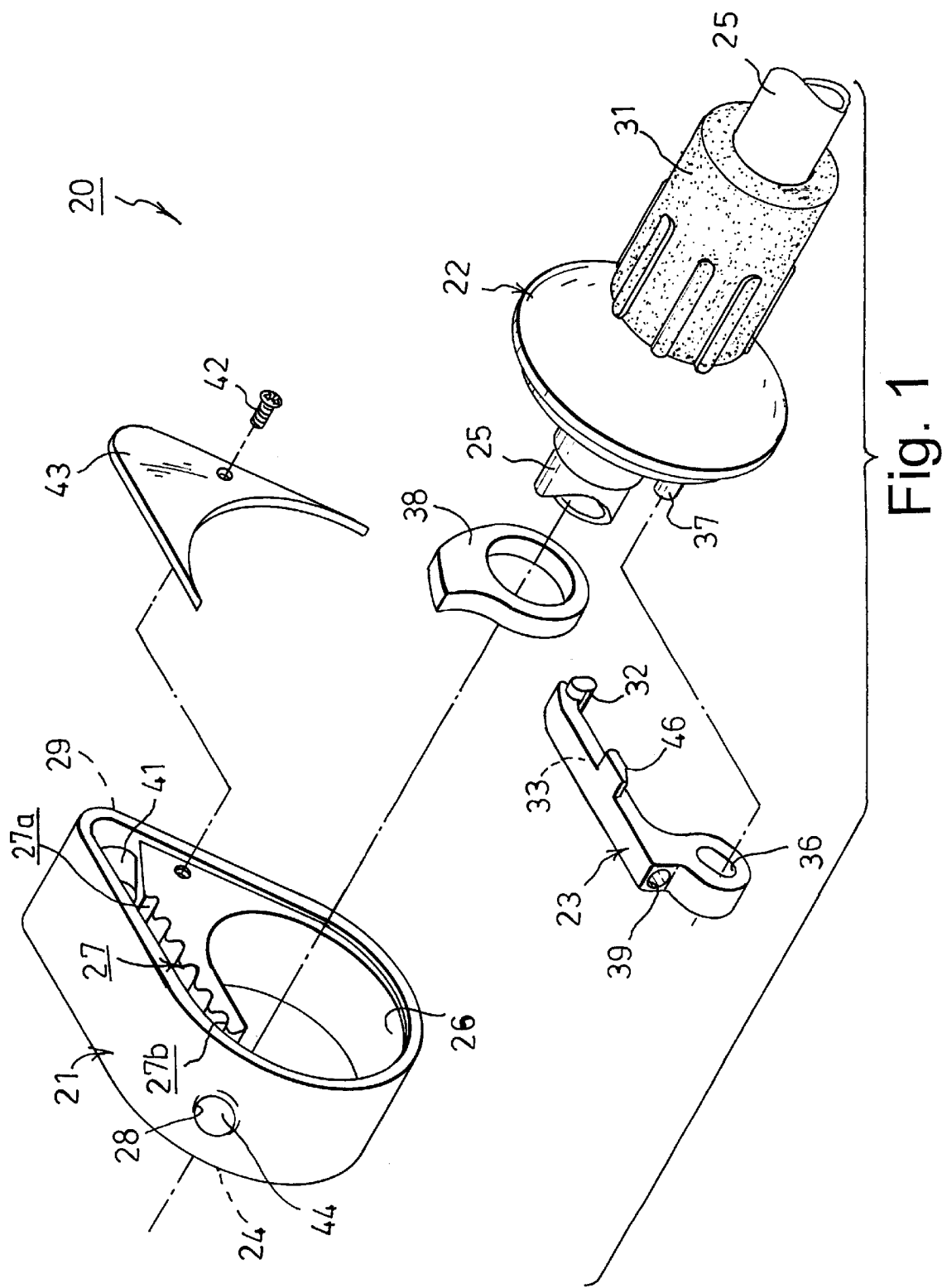
FIG. 1 is a perspective exploded view of the present invention.
Figure 2:
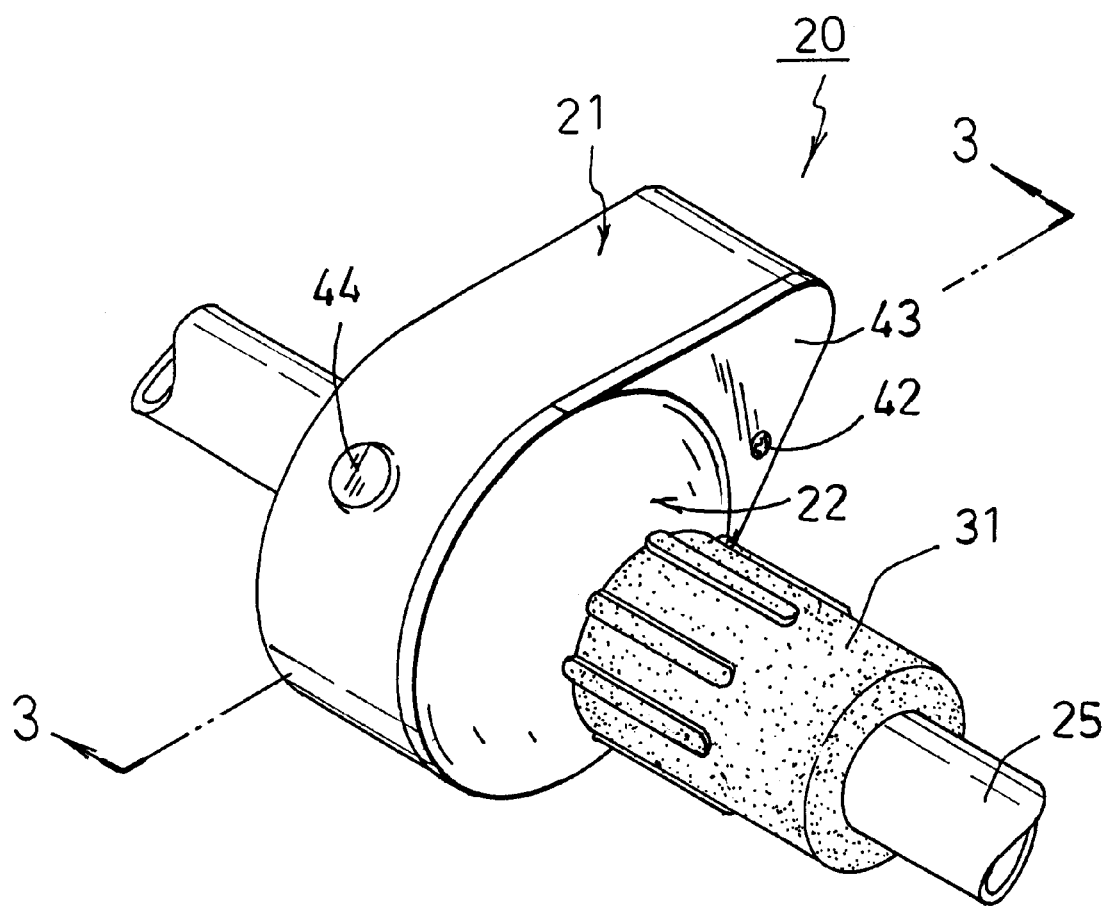
FIG. 2 is a perspective assembled view of the present invention.

Please refer to FIGS. 1 to 4. The easy cord-passing structure 20 of shift handle of a bicycle of the present invention includes a fixing casing 21, a rotary member 22 and a cord-guiding link 23.

The fixing casing 21 is formed with a central through hole 24 for the handle 25 of the bicycle to pass therethrough. The fixing casing 21 is fixed around the handle 25. The fixing casing 21 has an annular inner cavity 26, a locating rack 27, a steel cord inlet 28 and a steel cord outlet 29.

The annular inner cavity 26 is formed around the through hole 24. The locating rack 27 has multiple wayed locating teeth 30. The locating rack 27 further has a first end 27a and a second end 27b. The locating rack 27 integrally extends from the annular inner cavity 26 with the second end 27b suspending in the inner cavity 26. Each waved locating tooth 30 of the locating rack 27 has a wave face 30a with smaller slope and a wave face 30b with larger slope.

The steel cord inlet 28 is formed through the fixing casing 21 and adjacent to the second end 27b of the locating rack 27. The steel cord outlet 29 is also formed through the fixing casing 21 and adjacent to the first end 27a of the locating rack 27.

The rotary member 22 is rotatably disposed on the bicycle handle 25 and connected with the shift handle 31. The rotary member 22 is positioned in the annular inner cavity 26 of the fixing casing 21 and rotatable along with the shift handle 31.

The cord-guiding link 23 has a first end 23a and a second end 23b. The first end 23a is pivotally connected with the rotary member 22. The second end 23b has a hook section 32 snugly latched with one of the locating teeth 30. The hook section 32 can slide and shift into the tooth trough of any other locating tooth 30 and latch therewith. The cord-guiding link 23 has a cord-guiding passage 33 passing from the first end 23a to the second end 23b. The cord-guiding passage 33 is positioned between the steel cord inlet 28 and the steel cord outlet 29, whereby the steel cord 34 can be conducted from the inlet 28 through the passage 33 to the outlet 29 and out of the fixing casing 21. The wave face 30b with large slope of the locating tooth 30 serves to stop the hook section 32 of the link 23 from accidentally sliding from a latched locating tooth 30 to another in direction of arrow 47. Accordingly, the resilient force of a spring (not shown) applied to the other end of the steel cord 34 cannot via the steel cord 34 pull the cord-guiding link 23 so that the hook section 32 of the link 23 is prevented from accidentally sliding from a latched locating tooth 30 to another in direction of arrow 47.

The easy cord-passing structure of the present invention further includes a retardant driving mechanism 35 which includes a slide slot 36 and a pivot section 37 slidably disposed in the slide slot 36. One of the slide slot 36 and the pivot section 37 is disposed at the first end 23a of the cord-guiding link 23, while the other is disposed on the rotary member 22. Accordingly, the shift of the cord-guiding link 23 is retarded after the rotation of the rotary member 22.

The easy cord-passing structure of the present invention further includes a cam 38 fixed on the rotary member 22 and rotatable along with the rotary member 22. The cam 38 pushes the cord-guiding link 23 and makes the same pivotally rotate about the first end 23a thereof, whereby the hook section 32 is disengaged from the locating tooth 30.

The first end 23a of the cord-guiding link 23 further has a cord head locating hole 39 in which the cord head 40 of the steel cord 34 is engaged.

The easy cord-passing structure of the present invention further includes a cord-guiding tube 41 disposed in the annular inner cavity 26 of the fixing casing 21. One end of the cord-guiding tube 41 is connected at the steel cord outlet 29 of the fixing casing 21, while the other end thereof is formed with a trumpet opening 41a and adjacent to the first end 27a of the locating rack 27. When the rotary member 22 is turned to a maximum cord-loosening position, the first end 23a of the cord-guiding link 23 is right aimed at the steel cord inlet 28 of the fixing casing 21, while the second end 23b of the cord-guiding link 23 is right aimed at the trumpet opening 41a of the cord-guiding tube 41. Accordingly, the steel cord inlet 28, the cord-guiding passage 33, the cord-guiding tube 41 and the steel cord outlet 29 are connected to form a continuous straight passage. Therefore, the steel cord 34 can be smoothly conducted from the steel cord inlet 28 into the fixing casing 21 and through the cord-guiding passage 33 and the cord-guiding tube 41 and conducted out of the fixing casing 21 from the steel cord outlet 29.

Figure 3:
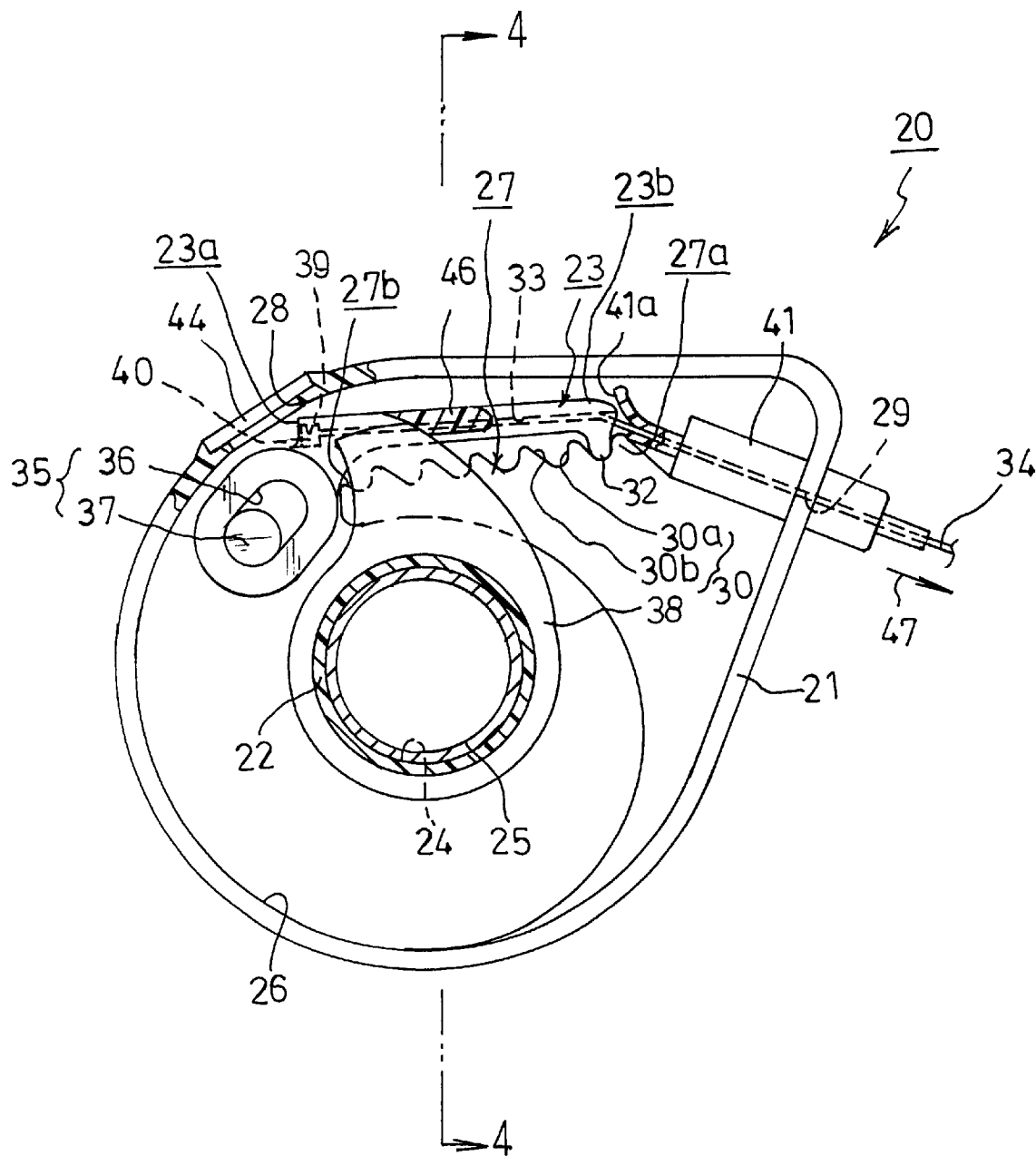
FIG. 3 is a sectional view taken along line 3—3 of FIG. 2, showing a state permitting the steel cord to pass.
Figure 4:
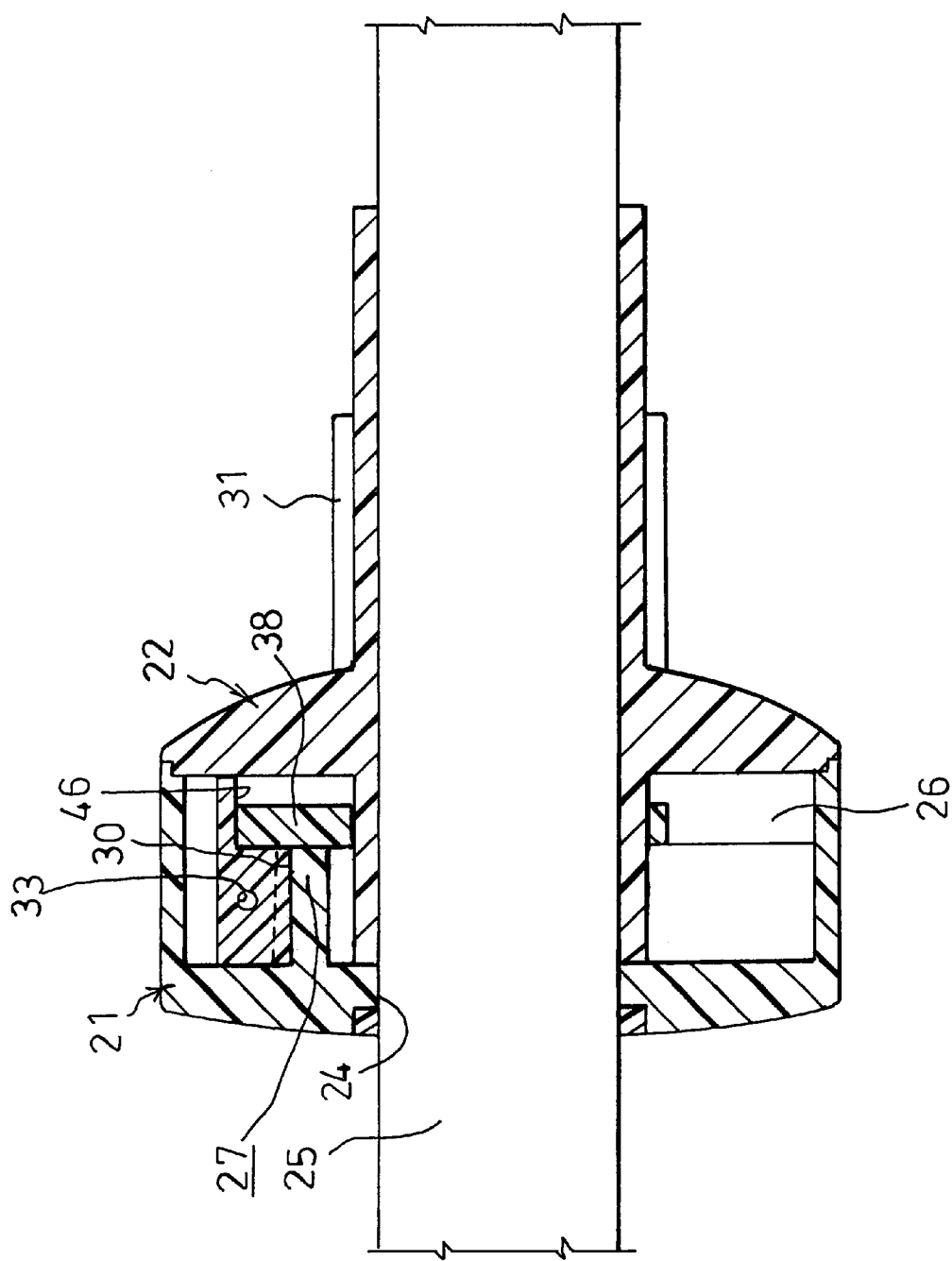
FIG. 4 is a sectional view taken along line 4—4 of FIG. 3.

When assembled, the rotary member 22 and the cord-guiding link 23 are first sequentially mounted in the fixing casing 21. Then the sealing cover 43 is locked on the fixing casing 21 by screws 42 and the rotary member 22 is turned rightward to a maximum cord-loosening position ( as shown in FIG. 3 ). In this position, the left end of the cord-guiding link 23 is right aimed at the steel cord inlet 28 of the fixing casing 21, while the right end of the cord-guiding link 23 is right aimed at the trumpet opening 41a of the cord-guiding tube 41. At this time, the steel cord inlet 28, the cord-guiding passage 33, the cord-guiding tube 41 and the steel cord outlet 29 are connected to form a continuous straight passage through which the steel cord 34 can be passed through the fixing casing 21.

When passing the steel cord 34 through the fixing casing 21, an operator only needs to first conduct the steel cord 34 from the steel cord inlet 28 into the fixing casing 21. Then, the steel cord 34 is guided by the cord-guiding passage 33 and the cord-guiding tube 41 to smoothly pass through the steel cord outlet 29 out of the fixing casing 21. Accordingly, the cord-passing operation can be easily and conveniently completed. Finally, a plastic sealing plug 44 is plugged into the steel cord inlet 28 to complete the assembly.

Alternatively, the steel cord inlet 28 of the fixing casing 21 can be omitted. After the steel cord 34 is conducted into the cord-guiding passage 33, the steel cord is firmly fixed in the cord-guiding link 23. During passing the steel cord, the cord head 40 of the resilient steel cord 34 and a small section of the steel cord adjacent to the cord head 40 are firmly fixed in the cord-guiding link 23 so that the steel cord 34 and the cord-guiding link 23 are prevented from freely bounding to interfere with the cord-passing operation. Accordingly, when passing the steel cord, the steel cord 34 is first conducted into the cord-guiding passage 33, whereby the steel cord 34 and the cord-guiding link 23 form an integral structure. Then, the cord-guiding link 23 through which the steel cord 34 is passed is fitted into the pivot section 37. At this time, the rotary member 22 is not yet slided into the annular inner cavity 26 of the fixing casing 21. The operator can at easy conduct the other end of the steel cord 34 through the cord-guiding tube 41 and out of the fixing casing 21 from the steel cord outlet 29. After tensioning the steel cord 34, the rotary member 22 is pushed into the annular inner cavity 26 of the fixing casing 21 and the sealing cover 43 is locked on the fixing casing 21 by screws 42. This embodiment provides another measure for easily and conveniently passing the steel cord.

When shifting, a user tightly holds the shift handle 31 and turns the shift handle 31 clockwise. At this time, the rotary member 22 is also clockwise rotated to drive the pivot section 37 to slide rightward along the slide slot 36 of the cord-guiding link 23. During the sliding of the pivot section 37, the pivot section 37 cannot drive the cord-guiding link 23 so that the cord-guiding link 23 temporarily has no action. However, during the sliding of the pivot section 37, the cam 38 is driven to rotate clockwise. The cam 38 will first contact with the projecting wing 46 of the cord-guiding link 23 to lift the same. At this time, the hook section 32 of the cord-guiding link 23 is upward disengaged from the waved locating tooth 30 of the locating rack 27, whereby the hook section 32 of the cord-guiding link 23 is easier to slide over the wave face 30b of the locating tooth 30 with larger slope. Therefore, the user needn't apply a great rotating force onto the shift handle 31.

Then, the rotary member 22 is further rotated clockwise and the pivot section 37 thereof starts to drive the cord-guiding link 23 to slide rightward so that the hook section 32 of the cord-guiding link 23 is slided to next or several next locating tooth 30 and located therein. When the user stops rotating the rotary member 22 clockwise, the hook section 32 of the cord-guiding link 23 is located in a selected locating tooth 30. Thereafter, the other end of the steel cord 34 is provided with a spring ( not shown ) so that the steel cord 34 is immediately pulled to move in direction of arrow 47 and the cord-guiding link 23 is pulled to further move rightward until the left end of the slide slot 36 of the cord-guiding link 23 contacts with the pivot section 37. At this time, the cord-guiding link 23 and the steel cord 34 stop moving rightward and the shifting operation is completed.

When the user tightly holds the shift handle 31 and turns it counterclockwise, the rotary member 22 is also counterclockwise rotated, whereby the pivot section 37 thereof drives the cord-guiding link 23 to move leftward. At this time, the cam 38 will not contact with the projecting wing 46 of the cord-guiding link 23 so that the cord-guiding link 23 is not lifted. Under such circumstance, the hook section 32 of the cord-guiding link 23 can be easily slided over the wave face 30a of the locating tooth 30 with smaller slope into another locating tooth 30 and located therein.

The present invention has the following advantages:

1. The cord-guiding link is connected between the steel cord inlet and outlet of the fixing casing, whereby the steel cord can be nearly linearly passed from the steel cord inlet through the cord-guiding passage to the steel cord outlet and out of the fixing casing. Therefore, the cord-passing operation becomes very easy, convenient and time-saving.

2. The cord-guiding link has a straight cord-guiding passage for the steel cord to pass therethrough. One end of the cord-guiding link has a cord head locating hole in which the cord head of the steel cord is engaged. After the steel cord is passed through the cord-guiding passage, the steel cord is firmly fixed in the cord-guiding link. Accordingly, the steel cord and the cord-guiding link are prevented from freely bounding to interfere with the cord-passing operation.

3. The cord-guiding link not only permits the steel cord to pass therethrough, but also is able to pull the steel cord. In addition, the cord-guiding link has a hook section providing locating effect. The cord-guiding link has both functions of cord-pulling of the conventional rotary member and location of the conventional locating catapult. Therefore, the cord-passing structure of the present invention is simplified and the assembly is facilitated.

The above embodiments are only used to illustrate the present invention, not intended to limit the scope thereof. Many modifications of the above embodiments can be made without departing from the spirit of the present invention.

What is claimed is:

1. Easy cord-passing structure of shift handle of a bicycle, comprising:

a fixing casing formed with a central through hole for the handle of the bicycle to pass therethrough, the fixing casing being fixed around the bicycle handle and having: an annular inner cavity formed around the through hole, a locating rack having multiple waved locating teeth, the locating rack having a first end and a second end, the locating rack integrally extending from the annular inner cavity with the second end suspending in the inner cavity, a steel cord inlet being formed through the fixing casing and adjacent to the second end of the locating rack, a steel cord outlet being also formed through the fixing casing and adjacent to the first end of the locating rack;

a rotary member rotatably disposed on the bicycle handle and connected with the shift handle, the rotary member being positioned in the annular inner cavity of the fixing casing and rotatable along with the shift handle; and a cord-guiding link having a first end and a second end, the first end being pivotally connected with the rotary member, the second end having a hook section snugly latched with one of the locating teeth, the hook section being slidable into the tooth trough of any other locating tooth and latch therewith, the cord-guiding link having a cord-guiding passage passing from the first end to the second end of the cord-guiding link, the cord-guiding passage being positioned between the steel cord inlet and the steel cord outlet, whereby the steel cord can be conducted from the inlet through the cord-guiding passage to the outlet and out of the fixing casing.

2. Easy cord-passing structure of shift handle of a bicycle as claimed in claim 1, further comprising a retardant driving mechanism which includes a slide slot and a pivot section slidably disposed in the slide slot, one of the slide slot and the pivot section being disposed at the first end of the cord-guiding link, while the other being disposed on the rotary member, whereby the shift of the cord-guiding link is retarded after the rotation of the rotary member.

3. Easy cord-passing structure of shift handle of a bicycle as claimed in claim 2, further comprising a cam fixed on the rotary member and rotatable along with the rotary member, the cam pushing the cord-guiding link and making the same pivotally rotate about the first end thereof, whereby the hook section of the cord-guiding link is disengaged from the locating tooth.

4. Easy cord-passing structure of shift handle of a bicycle as claimed in claim 1, wherein the first end of the cord-guiding link further has a cord head locating hole in which the cord head of the steel cord is engaged.

5. Easy cord-passing structure of shift handle of a bicycle as claimed in claim 3, further comprising a cord-guiding tube disposed in the annular inner cavity of the fixing casing, one end of the cord-guiding tube being connected at the steel cord outlet of the fixing casing, while the other end thereof being formed with a trumpet opening and adjacent to the first end of the locating rack, whereby when the rotary member is turned to a maximum cord-loosening position, the first end of the cord-guiding link is right aimed at the steel cord inlet of the fixing casing, while the second end of the cord-guiding link is right aimed at the trumpet opening of the cord-guiding tube and the steel cord inlet, the cord-guiding passage, the cord-guiding tube and the steel cord outlet are connected to form a continuous straight passage, the steel cord being smoothly conducted from the steel cord inlet into the fixing casing and through the cord-guiding passage and the cord-guiding tube and conducted out of the fixing casing from the steel cord outlet.

* * * * *